（12）United States Patent
Kannan et al.

(10) Patent No.: US 10,798,245 B2
(45) Date of Patent: *Oct. 6, 2020

(54) METHOD AND APPARATUS FOR FACILITATING AGENT CONVERSATIONS WITH CUSTOMERS OF AN ENTERPRISE

(71) Applicant: [24]7.ai, Inc., San Jose, CA (US)

(72) Inventors: Pallipuram V. Kannan, San Jose, CA (US); Subha Sethumadhavan, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,552

(22) Filed: Feb. 20, 2020

(65) Prior Publication Data

US 2020/0195782 A1 Jun. 18, 2020

Related U.S. Application Data

(63) Continuation of application No. 16/174,723, filed on Oct. 30, 2018, now Pat. No. 10,574,824.

(60) Provisional application No. 62/580,748, filed on Nov. 2, 2017.

(51) Int. Cl.
*H04M 3/523* (2006.01)
*H04M 3/51* (2006.01)

(52) U.S. Cl.
CPC ....... *H04M 3/5235* (2013.01); *H04M 3/5166* (2013.01)

(58) Field of Classification Search
CPC ............. H04M 3/5235; H04M 3/5166; H04M 3/5238; H04M 3/5175
USPC .... 379/265.1, 265.05, 265.11, 265.01, 88.01
See application file for complete search history.

(56) References Cited

U.S. PATENT DOCUMENTS

| | | |
|---|---|---|
| 8,000,973 B2 | 8/2011 | Williams et al. |
| 9,786,011 B1 | 10/2017 | Engelhorn et al. |
| 2015/0382047 A1 | 12/2015 | Van Os et al. |
| 2016/0295018 A1 | 10/2016 | Lotfus et al. |
| 2016/0358240 A1 | 12/2016 | Redfern et al. |
| 2017/0103346 A1* | 4/2017 | Bodell ................. G06Q 30/016 |
| 2017/0214799 A1 | 7/2017 | Perez et al. |
| 2017/0277993 A1 | 9/2017 | Beaver et al. |
| 2018/0054523 A1 | 2/2018 | Zhang et al. |

\* cited by examiner

*Primary Examiner* — Thjuan K Addy
(74) *Attorney, Agent, or Firm* — Perkins Coie LLP; Michael Glenn

(57) ABSTRACT

In a method and apparatus for facilitating agent interactions with customers of an enterprise, one or more intents corresponding to an input provided by a customer during a conversation with a Virtual Agent (VA) are predicted. A confidence score corresponding to each intent is computed that is indicative of an ability of the VA to provide an effective response to the input. The confidence score corresponding to each intent is compared with a predefined threshold score. If the confidence score is less than the predefined threshold score, the conversation is deflected from the VA to a human agent to respond to the input of the customer. The conversation is deflected from the human agent to the VA for a subsequent input if a respective confidence score of at least one intent predicted for the subsequent input is greater than or equal to the predefined threshold score.

20 Claims, 9 Drawing Sheets

METHOD AND APPARATUS FOR FACILITATING AGENT CONVERSATIONS WITH CUSTOMERS OF AN ENTERPRISE

CROSS REFERENCE TO RELATED APPLICATIONS

This application is a continuation of U.S. patent application Ser. No. 16/174,723 filed Oct. 30, 2018, now U.S. Pat. No. 10,574,874, which claims priority to U.S. provisional patent application Ser. No. 62/580,748, filed Nov. 2, 2017, the contents of which are incorporated herein in their entirety by this reference thereto.

TECHNICAL FIELD

The present technology generally relates to conversations between customers and agents of an enterprise, and more particularly to a method and apparatus for facilitating agent conversations with customers of an enterprise.

BACKGROUND

Typically, a customer may wish to converse with a customer support representative of an enterprise to enquire about products/services of interest, to resolve concerns, to make payments, to lodge complaints, and the like. To serve such a purpose, the enterprises may deploy both, live and automated conversational agents to interact with the customers and provide them with desired assistance.

Generally, when a customer contacts customer support using speech or text interface, the first interaction takes place with an automated conversational agent, also referred to herein as a Virtual Agent (VA). The VA may use Natural Language Processing (NLP) algorithms and special grammar to interpret customer's natural language inputs, whether provided in a spoken form or a textual form and respond appropriately.

Customers seeking assistance from customer support representatives may pose a variety of queries to the VAs. Furthermore, queries with similar intentions may be framed differently by different customers. In many example scenarios, a VA may be limited in its ability to provide assistance to some customers on account of a sheer variety of requests that the VA has to interpret and thereafter accomplish tasks to service those requests. In some scenarios, if the VA is not being able to interpret a customer query correctly, it may be configured to request the customer to ask the query in a different form or to end the conversation and deflect the rest of the conversation to a human agent.

Such an approach has several shortcomings. For example, it is observed that a large number of conversations get handed over to human agents, who are trained to take the conversation to a graceful closure. As a result of such deflections, time spent on conversations by human agents increases substantially, which may not be preferred by the enterprises.

Further, as explained above, in some scenarios the VA may be configured to request the customer to ask the question in a different form if the customer query is not clear. In some scenarios, the query disambiguation may take longer and the customer may not get the best experience in a timely manner.

SUMMARY

In an embodiment of the invention, a computer-implemented method for facilitating agent conversations with customers of an enterprise is disclosed. The method predicts, by a processor, one or more intents corresponding to an input provided by a customer during a conversation with a Virtual Agent (VA). The method computes, by the processor, a confidence score corresponding to each intent from among the one or more intents. The confidence score is indicative of an ability of the VA to provide an effective response to the input provided by the customer. The method compares, by the processor, the confidence score corresponding to each intent with a predefined threshold score. If the confidence score corresponding to each intent is less than the predefined threshold score, the method deflects the conversation, by the processor, from the VA to a human agent to respond to the input of the customer. The conversation is deflected back from the human agent to the VA for a subsequent input if a respective confidence score of at least one intent predicted for the subsequent input is greater than or equal to the predefined threshold score.

In an embodiment, an apparatus for apparatus for facilitating agent conversations with customers of an enterprise is disclosed. The apparatus includes a processor and a memory. The memory stores instructions. The processor is configured to execute the instructions and thereby cause the apparatus to predict one or more intents corresponding to an input provided by a customer during a conversation with a Virtual Agent (VA). The apparatus computes a confidence score corresponding to each intent from among the one or more intents. The confidence score is indicative of an ability of the VA to provide an effective response to the input provided by the customer. The apparatus compares the confidence score corresponding to each intent with a predefined threshold score. If the confidence score corresponding to each intent is less than the predefined threshold score, the apparatus deflects the conversation from the VA to a human agent to respond to the input of the customer. The conversation is deflected back from the human agent to the VA for a subsequent input if a respective confidence score of at least one intent predicted for the subsequent input is greater than or equal to the predefined threshold score.

In an embodiment of the invention, another computer-implemented method for facilitating agent conversations with customers of an enterprise is disclosed. The method receives, by a processor, a request for a conversation with an agent. The request is provided by a customer. The method connects the customer to a Virtual Agent (VA) by the processor in response to the receipt of the request for the conversation. For each input provided by the customer during a course of the conversation, the method selects one of the VA and a human agent to respond to the respective input. The selection is performed based on a measure of confidence computed corresponding to the respective input. The measure of confidence is indicative of an ability of the VA to provide an effective response to the respective input provided by the customer. The conversation is deflected from the VA to the human agent if the measure of confidence for the input is less than a predefined threshold score. The conversation is deflected back from the human agent to the VA for a subsequent input if a respective measure of confidence computed corresponding to the subsequent input is greater than or equal to the predefined threshold score.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
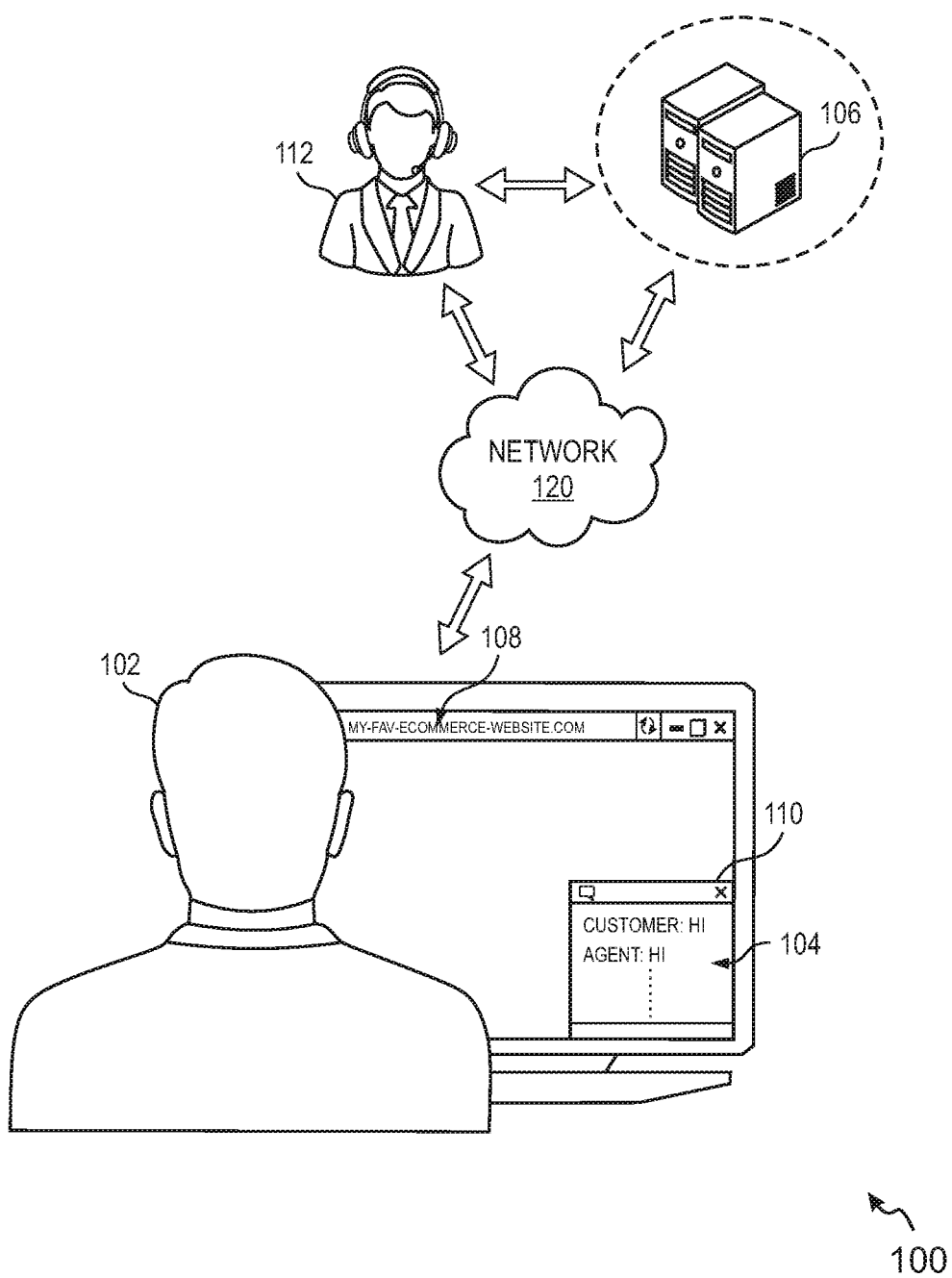
FIG. 1 shows a representation of a customer engaged in a chat conversation with an automated conversational agent, in accordance with an example scenario.

FIG. 1 shows a representation 100 of a customer 102 engaged in a chat conversation 104 with an automated conversational agent 106, in accordance with an example scenario. In an illustrative example, the customer 102 may be browsing a Website 108 of an enterprise and wish to seek assistance from a customer support representative during a current visit to the enterprise Website 108. The customer 102 may wish to seek assistance from the customer support representative for a variety of reasons. For example, the customer 102 may wish to enquire about a product or a billing plan being displayed on the Website 108 and, accordingly, the customer 102 may seek a conversation with a customer support representative. In another illustrative example, the customer 102 may face a problem while completing a purchase transaction on the Website 108 and may seek assistance from a customer support representative in troubleshooting the issue.

Most enterprises typically display widgets or hyperlinks on their respective Websites, which are associated with text such as 'Let's Chat' or 'Need Assistance, Click Here!'. The customer 102 may click on the widget or the hyperlink to seek assistance. Upon receiving a selection input corresponding to the widget or the hyperlink from the customer 102, a Web server hosting the Website 108 may be configured to cause display of a chat console such as the chat console 110 on the display screen of the electronic device associated with the customer 102. The customer 102 may thereafter engage in a textual chat conversation such as the chat conversation 104 with the automated conversational agent 106, for receiving desired assistance. The automated conversational agent 106 is hereinafter referred to as a Virtual Agent (VA) 106. It is noted that the VA 106 is embodied as a chatbot in such a scenario. Further, it is noted that the communication between the customer 102 and the VA 106 (or any other agent associated with the enterprise) may be facilitated over a communication network, such as a network 120 depicted in FIG. 1. The network 120 may be embodied as a wired network (for example, Ethernet or a Local Area Network (LAN)), a wireless network (for example, a cellular network or a wireless LAN) or a combination of wired and wireless networks (for example, the Internet).

In some example scenarios, upon clicking the widget or the hyperlink, the customer 102 may be connected to a live agent (i.e. a human agent), such as a human agent 112, instead of the VA 106. The customer 102 may chat with the human agent 112 to seek the desired assistance.

In some example scenarios, the customer 102 may also call a customer care number displayed on the enterprise Website 108 and connect with an automated conversational agent, such as for example an Interactive Voice Response (IVR) system, to seek assistance therefrom. It is noted that in such a scenario, the VA 106 is embodied as an IVR system and, moreover, the conversation is embodied as voice conversation. Similarly, in some scenarios, upon calling the customer care number, the customer 102 may be connected to the human agent 112 for engaging in a voice conversation. The conversations between customers and conversational agents (for example, human agents and VAs) may be stored as conversational transcripts in a server associated with the customer support center for subsequent analysis and learning purposes.

In many example scenarios, the VA 106 may be limited in its ability to provide assistance to some customers on account of a sheer variety of requests that the VA 106 has to interpret and thereafter accomplish tasks to service those requests. In some scenarios, if the VA 106 is not being able to interpret the query correctly, it may be configured to request a customer to ask the query in a different form (for example, to disambiguate the question) or to end the conversation and deflect the rest of the conversation to a human agent, such as the human agent 112. Such an approach has several shortcomings. For example, it is observed that a large number of conversations get handed over to human agents, who are trained to take the conversation to a graceful closure. As a result of such deflections, time spent on conversations by human agents increases substantially, which may not be preferred by the enterprises. Further, in some scenarios, the customer query may need to be disambiguated, which may take longer, and customer may not get the best experience in a timely manner.

Various embodiments of the present technology provide a method and apparatus that are capable of overcoming these and other obstacles and providing additional benefits. More specifically, various embodiments disclosed herein present techniques for facilitating agent conversations with the customers in a manner that ensures right assistance is provided to the customers in a timely manner irrespective of whether they are being served by a VA or a human agent.

In one embodiment, an apparatus is disclosed, which not only facilitates in predicting the intent(s) of the query posed by the customer during an ongoing conversation, but also computes a measure of confidence indicative of the VA's ability to provide an effective response to the query. If the measure of confidence is high, the VA is configured to directly answer the customer query.

If the measure of confidence is low, the apparatus is configured to deflect the conversation from the VA to a human agent. The apparatus provides the human agent with contextual information about the conversation, its summary and the currently determined intent. The human agent may answer the current query using the contextual information. For a subsequent customer query, the measure of confidence may once again be computed corresponding to the query intent(s) and if the measure of confidence is high (indicating high confidence in the VA's ability to provide an effective response for this particular input), the apparatus may be configured to deflect the conversation back from the human agent to the VA. This reduces the average handle time (AHT) of the human agents as the human agents intervene only briefly when the VA is not able to respond to the customer query with high confidence. Moreover, the AHT for the human agents is also reduced, as their intervention is limited to scenarios when the VA is not capable of responding to a customer query with high confidence and not based on the presence or absence of an appropriate response in the repository of answers.

In some example embodiments, the VAs may also intervene in ongoing human agent interactions with customers. For example, in scenarios where a human agent may take time to fetch an appropriate answer from a database and where an answer is readily available with the VA, the VA may intervene in the conversation, thereby enabling reduction in the AHT of the human agent. The human agent may then resume the conversation when it is more appropriate for the human agent to conduct the conversation.

Such interweaving of VA and human agent responses in an ongoing conversation with the customer provides a high-quality experience to the customer and, moreover, the assistance is provided to the customer in a timely manner.

An apparatus for facilitating agent conversations with customers of an enterprise is explained with reference to FIG. 2.

Figure 2:
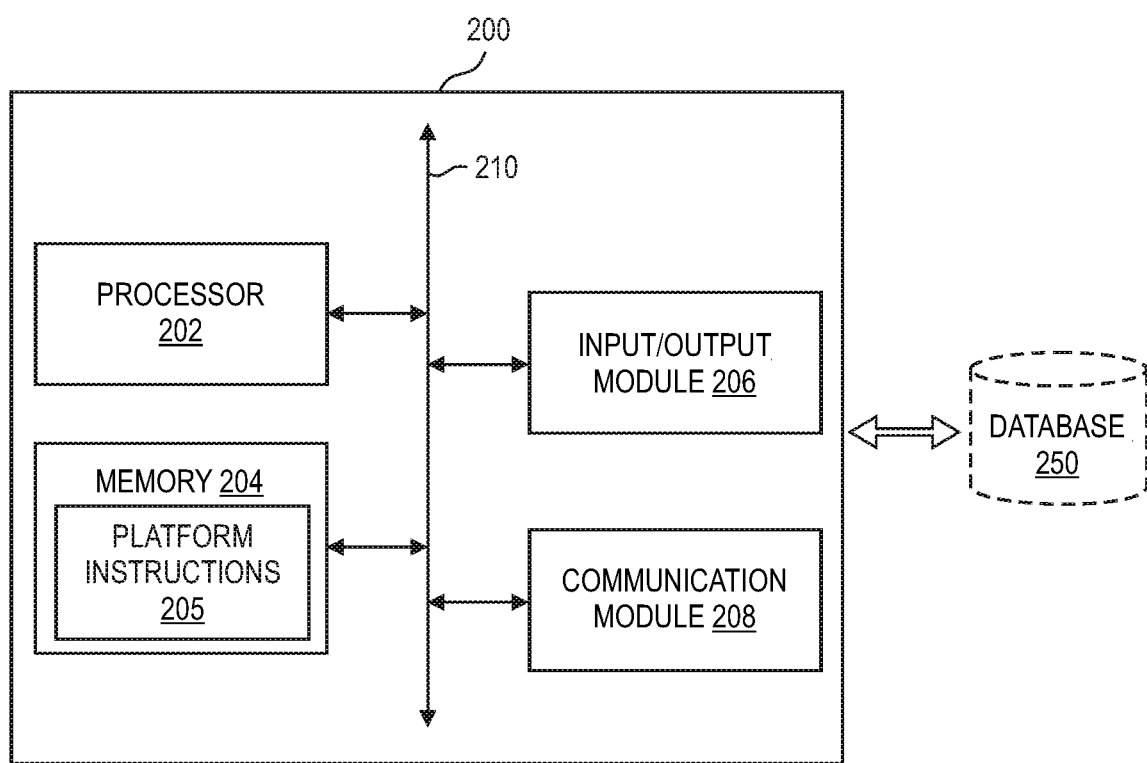
FIG. 2 is a block diagram of an apparatus configured to facilitate agent conversations with customers of an enterprise, in accordance with an embodiment of the invention.

FIG. 2 is a block diagram of an apparatus 200 configured to facilitate agent conversations with customers of an enterprise, in accordance with an embodiment of the invention. The term 'agents' as used herein and throughout the description may refer to automated conversational agents or to human agents. It is noted that automated conversational agents include chatbots (i.e. automated agents configured to assist customers using textual chat conversation medium) and Interactive Voice Response (IVR) systems (i.e. automated agents configured to assist customers using a voice conversation medium). The automated conversational agents are hereinafter referred to as Virtual Agents (VA).

The term 'facilitating agent conversations with customers of an enterprise' as used herein implies enabling agents, whether VAs or human agents either individually or collectively, in conversing with customers of enterprises with a view of providing assistance to the customers with their queries such that the queries are answered with high confidence and in timely manner. Moreover, the term 'enterprise' as used herein may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. It is understood that the enterprise may be associated with potential and existing users of products, services and/or information offered by the enterprise. Such existing or potential users of enterprise offerings are referred to herein as customers of the enterprise.

In one embodiment, the apparatus 200 is embodied as an interaction platform. The one or more components of the interaction platform may be implemented as a set of software layers on top of existing hardware systems. The interaction platform may be communicably coupled, over a communication network (such as the network 120 shown in FIG. 1), with interaction channels and/or data gathering Web servers linked to the interaction channels to receive information related to customer interactions in an ongoing manner in substantially real-time. Further, the interaction platform is in operative communication with VAs and electronic devices of the human agents of one or more enterprises and configured to receive information related to customer-enterprise interactions from them.

The apparatus 200 includes at least one processor, such as a processor 202 and a memory 204. It is noted that although the apparatus 200 is depicted to include only one processor, the apparatus 200 may include more number of processors therein. In an embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc) and BD (BLU-RAY® Disc).

In at least some embodiments, the memory 204 is configured to store NLP logic and machine learning algorithms for facilitating prediction of customer intents. Further, the memory 204 may also be configured to include logic for determining a confidence score for each predicted intent and threshold level of confidence scores for triggering alerts and deflecting VA conversations to human agents and vice versa.

The apparatus 200 also includes an input/output module 206 (hereinafter referred to as an 'I/O module 206') and at least one communication module such as a communication module 208. In an embodiment, the I/O module 206 may include mechanisms configured to receive inputs from and provide outputs to the user of the apparatus 200. To that effect, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication module 208 may include several channel interfaces to receive information from a plurality of enterprise interaction channels. Some non-exhaustive examples of the enterprise interaction channels may include a Web channel (i.e. an enterprise Website), a voice channel (i.e. voice-based customer support), a chat channel (i.e. a chat support), a native mobile application channel, a social media channel, and the like. Each channel interface may be associated with respective communication circuitry such as for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities, such as VAs, electronic devices of human agents, Web servers hosting enterprise Website or a server at a customer support and service center configured to maintain real-time information related to conversations between customers and agents.

In at least one example embodiment, the channel interfaces are configured to receive up-to-date information related to the customer-enterprise interactions from the enterprise interaction channels. In some embodiments, the information may also be collated from the plurality of devices utilized by the customers. To that effect, the communication module 208 may be in operative communication with various customer touch points, such as electronic devices associated with the customers, Websites visited by the customers, devices used by customer support representatives (for example, voice agents, chat agents, IVR systems, in-store agents, and the like) engaged by the customers and the like.

The communication module 208 may further be configured to receive information related to customer interactions with agents, such as voice or chat interactions between customers and conversational agents (for example, automated conversational agents or live agents) being conducted using various interaction channels, in real-time and provide the information to the processor 202. In at least some embodiments, the communication module 208 may include relevant Application Programming Interfaces (APIs) to communicate with remote data gathering servers associated with such enterprise interaction channels. Moreover, the communication between the communication module 208 and the remote data gathering servers may be realized over various types of wired or wireless networks.

In an embodiment, various components of the apparatus 200, such as the processor 202, the memory 204, the I/O module 206 and the communication module 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is noted that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, one or more components of the apparatus 200 may be deployed in a Web Server. In another embodiment, the apparatus 200 may be a standalone component in a remote machine connected to a communication network and capable of executing a set of instructions (sequential and/or otherwise) to facilitate agent conversations with customers of the enterprise. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as agents' devices. In another embodiment, the apparatus 200 may be a central system that is shared by or accessible to each of such devices.

The apparatus 200 is depicted to be in operative communication with a database 250. The database 250 is any computer-operated hardware suitable for storing and/or retrieving data, such as, but not limited to, transcripts of conversations between agents and customers, a repository of programmed intents and learnt intents, and the like. Further, the database 250 may also store a registry of virtual agents and human agents.

The database 250 may include multiple storage units such as hard disks and/or solid-state disks in a redundant array of inexpensive disks (RAID) configuration. The database 250 may include a storage area network (SAN) and/or a network attached storage (NAS) system. In some embodiments, the database 250 is integrated within the apparatus 200. For example, the apparatus 200 may include one or more hard disk drives as the database 250. In other embodiments, database 250 is external to the apparatus 200 and may be accessed by the apparatus 200 using a storage interface (not shown in FIG. 2). The storage interface is any component capable of providing the processor 202 with access to the database 250. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 250.

The facilitation of agent conversations with customers of the enterprise is hereinafter explained with reference to a conversation between an agent of an enterprise and a customer of the enterprise. It is noted that the apparatus 200 may be configured to facilitate a plurality of agent conversations with a plurality of customers of the enterprise in a similar manner.

In at least one embodiment, the communication module 208 may be configured to receive a request for a conversation with an agent (i.e. with a customer support representative of an enterprise). As explained with reference to FIG. 1, a customer may request a conversation with an agent by clicking on a widget or a hyperlink on the Website displayed on the enterprise Website. The widget or the hyperlink may be configured to display text such as 'Let's Chat' or 'Need Assistance, Click Here!'. The customer may click on the widget or the hyperlink to seek assistance. In some example scenarios, the customer may also call a customer care number displayed on the enterprise Website to request a conversation with the agent. In at least some embodiments, the communication module 208 may be configured to receive such a request for interaction from the customer and forward the request to the processor 202. The processor 202 may be configured to use initial interaction handling logic stored in the memory 204 and, in conjunction with the registry of VAs stored in the database 250, determine a VA appropriate for interacting with the customer. In one embodiment, the next available VA from among a pool of VAs may be selected as the appropriate VA for conducting the conversation with the customer. In another embodiment, a high-level intent may be predicted based on the customer's current and/or past interaction history and the VA capable of handling customers for the predicted intent may be selected as the appropriate VA for conducing the conversation with the customer. In yet another embodiment, a customer's persona may be predicted based on current and past journeys of the customer on the enterprise interaction channels, and a VA more suited to a customer's persona type may be selected as the appropriate VA for conducing the conversation with the customer. The selected VA may thereafter initiate the conversation with the customer. It is noted that the term 'conversation' as throughout the description refers to a voice conversation or a textual chat conversation.

In an embodiment, the processor 202 is configured to receive customer conversational inputs or interaction inputs (hereinafter referred to as 'inputs') in substantially real-time on account of the communication module 208 being in operative communication with the electronic system embodying the VA.

In at least one example embodiment, the processor 202 is configured to compute a measure of confidence corresponding to each input provided by the customer during a course of the conversation. The measure of confidence is indicative of an ability of the VA to provide an effective response to the respective input provided by the customer. The term 'effective response' as used throughout the description refers to a reply appropriate to the input provided by the customer and which carries the conversation forward towards the resolution of the customer's query input. In most cases, the term 'effective response' may refer to a single VA input, which either partially or completely answers the customer's query input. However, in some cases, the term 'effective response' may involve an interim stage of disambiguation of the customer's query followed by the eventual resolution of the customer's query input.

The processor 202 is further configured to select one of the VA and a human agent to respond to each input provided by the customer during a course of the conversation based on a measure of confidence computed corresponding to the respective input. For example, if the measure of confidence computed for an input is high, i.e. greater than or equal to a predefined threshold score, then the VA may be selected to respond to the corresponding input. However, if the measure of confidence computed for an input is low, i.e. less than the predefined threshold score, then the conversation may be deflected from the VA to an appropriate human agent by the processor 202. Further, the conversation is deflected back from the human agent to the VA for a subsequent input if a respective measure of confidence for the subsequent input is greater than or equal to the predefined threshold score. Thus, the human agent intervenes only briefly, every time when the VA is not able to respond to the customer query with high confidence, thereby reducing the AHT of the human agent.

The computation of the measure of confidence and the selection of the VA or the human agent to respond to each customer input is further explained in detail hereinafter.

In one embodiment, the processor 202 is configured to use the NLP algorithms and other machine learning algorithms stored in the memory 204 to interpret each customer input and predict one or more intents of the customer corresponding to each customer input. In some embodiments, the customer's intent is predicted solely based on the customer's input. For example, the customer may provide the following input 'THE DELIVERY OF MY SHIPMENT HAS BEEN DELAYED BY TWO DAYS NOW. THIS IS UNACCEPTABLE!!' to an agent. Based on such an input, the processor 202 may be configured to predict the intent as 'SHIPMENT DELIVERY RELATED COMPLAINT'. In some embodiments, the customer intent may be predicted based on past interactions of the customer on enterprise interaction channels. For example, if a customer has recently purchased an airline ticket, then the intent for requesting conversation may most likely be related to confirmation of the flight time, rescheduling the journey or cancellation of the ticket. In some embodiments, the customer intent may be predicted based on current interaction of the customer on an enterprise interaction channel. For example, a customer having visited the enterprise Website may browse through a number of Web pages and may have viewed a number of products on the Website prior to requesting a conversation with an agent. All such activity of the customer during the current journey of the customer on the enterprise Website may be captured and used for intent prediction purposes.

In an illustrative example, content pieces such as images, hyperlinks, URLs, and the like, displayed on an enterprise Website may be associated with Hypertext Markup Language (HTML) tags or JavaScript tags that are configured to be invoked upon user selection of tagged content. The information corresponding to the customer's activity on the enterprise Web site may then be captured by recording an invoking of the tags in a Web server (i.e. a data gathering server) hosting the enterprise Website. In some embodiments, a socket connection may be implemented to capture all information related to the customer activity on the Website. The captured customer activity on the Website may include information such as Web pages visited, time spent on each Web page, menu options accessed, drop-down options selected or clicked, mouse movements, hypertext mark-up language (HTML) links those which are clicked and those which are not clicked, focus events (for example, events during which the customer has focused on a link/Web page for a more than a predetermined amount of time), non-focus events (for example, choices the customer did not make from information presented to the customer (for examples, products not selected) or non-viewed content derived from scroll history of the customer), touch events (for example, events involving a touch gesture on a touch-sensitive device such as a tablet), non-touch events and the like.

In at least one example embodiment, the communication module 208 may be configured to receive such information from the Web server hosting the Web pages associated with the Website. Further, in addition to information related to the customer's activity on the enterprise interaction channel, the captured customer data may also include information such as the device used for accessing the Website, the browser and the operating system associated with the device, the type of Internet connection (whether cellular or Wi-Fi), the IP address, the location co-ordinates, and the like.

In an embodiment, the processor 202 may be configured to transform or convert such information into a more meaningful or useful form. In an illustrative example, the transformation of information may include normalization of content included therein. In some embodiments, the processor 202 may be configured to normalize customer keyword searches on the Website, personal information such as phone numbers, email IDs etc. and so on.

The processor 202 is further caused to extract features from the transformed data. For example, the type of device used by the customer for requesting conversation with the agent may be identified as one feature. Similarly, the type of Internet connection may be identified as another feature. The sequence of Web pages visited by the customer prior to requesting the conversation with the agent may be identified as one feature. The category of products viewed/selected on the Web pages may be identified as another feature. Furthermore, customer conversational inputs split into n-grams, unigrams, bigrams and trigrams and the word phrases in the conversational inputs may also be selected as features.

In at least one example embodiment, the memory 204 is configured to store one or more intention prediction models, which are referred to herein as classifiers. The extracted features from the transformed customer data may then be provided to at least one classifier associated with intention prediction to facilitate prediction of the at least one intention of customer. In an embodiment, the classifiers may utilize any combination of the above-mentioned input features to predict the customer's likely intents.

Accordingly, as explained above, one or more customer intents may be predicted based on current input, current journey and/or past journey on the enterprise interaction channels.

In at least one example embodiment, the processor 202 is configured to compute a confidence score corresponding to each intent from among the one or more intents predicted corresponding to the customer's input. The computed confidence score corresponding to each intent may serve as the measure of confidence indicative of an ability of the VA to provide an effective response to the input provided by the customer. For example, during an agent interaction with a customer, a customer may provide several inputs in an ongoing manner. The processor 202 may be configured to receive the inputs provided by the customer in substantially real-time and predict one or more intents for each customer input. The processor 202 may further be configured to use machine-learning algorithms to compute a confidence score corresponding to each predicted intent. In some example scenarios, the processor 202 may be configured to predict one or more intents for a customer input and each predicted intent may be associated with a respective confidence score.

In one embodiment, the intent prediction classifier is trained to output a numerical value signifying a confidence score of the corresponding prediction. For example, in the simplest illustrative form, if 85% of customers who had a particular sequence of visiting Web pages on the enterprise Website, were of a particular gender and age group and used a particular device and browser, had contacted customer support for a particular intent, then the classifier may be trained to output a numerical value '0.85' for a predicted intent corresponding to customer input. This may signify that the 85% of the times the predicted intent matched the customer input based on the characteristic/features exhibited by the customer and/or customer activity on the enterprise interaction channels. The classifier may be provided with transcripts of a large number of previous conversations along with identified intents for the customer inputs in those conversations so as to train the classifier in computing the confidence score corresponding to each predicted intent.

In one embodiment, the confidence score is computed based on a degree of correlation between the customer input and a stored prediction from among a plurality of stored predictions. More specifically, a plurality of probable customer intents may be stored in the database 250. Each stored intent may be tagged with several keywords related to the intent. The words in the customer input and the variations thereof may be correlated with tagged keywords to determine a degree of correlation therebetween. The degree of correlation may configure a degree of confidence in correct prediction of the intent, which in turn, signifies a degree of confidence in the VA's ability to provide an effective response to the input. In an illustrative example, if an intent 'Intent 1' is predicted for a customer input and it is associated with a confidence score of '0.7', then it is implied that there is 70% likelihood of the Intent 1 being the correct intent of the customer. Accordingly, for a response provided to the customer by the VA based on the predicted intent, there is a 70% likelihood of the answer being the appropriate answer to the query. To that effect, the confidence score of the predicted intent reflects a measure of how confident the VA is of providing an effective response (i.e. of responding appropriately) to the customer's input.

In at least one example embodiment, the processor 202 is configured to compare the confidence score corresponding to each intent with a predefined threshold score. In an illustrative example, the predefined threshold score is '0.8' (i.e. 80%). It is noted that the predefined threshold score may be selected to be any value based on machine learning and/or empirical research.

If the confidence score corresponding to each intent is less than the predefined threshold score, the processor 202 is configured to deflect the conversation from the VA to a human agent to respond to the input of the customer. If the confidence score of at least one intent from among the one or more intents corresponding to the input is greater than or equal to the predefined threshold score, the VA is configured to provide the response to the customer. In one embodiment, the response provided by the VA includes a request to the customer to provide clarification on the input if the confidence score corresponding to two or more intents is greater than or equal to the predefined threshold score.

In one embodiment, the processor 202 may receive a clarification input provided by the customer in response to the request. The processor 202 is configured to process the clarification input, where the processing of the clarification input includes performing the steps of predicting intents, computing confidence scores for predicted intents and comparing the confidence scores to the predefined threshold score to determine whether the VA is capable of responding to the clarification input. If the VA is determined to be capable of responding to the clarification input, then the VA may be configured to provide the response (i.e. the effective response) to the customer. If not, the conversation is deflected from the VA to the human agent by the processor 202.

In at least one example embodiment, the processor 202 is configured to pass contextual information related to the conversation between the customer and the VA to the human agent subsequent to deflection of the conversation from the VA to the human agent. The contextual information may include a summary of the conversation so far, predicted intents for previous customer inputs, etc. The contextual information enables the human agent to respond appropriately to the customer's input.

In some cases, the conversation may be deflected back from the human agent to the VA for a subsequent input if a respective confidence score of at least one intent for the subsequent input is greater than the predefined threshold score. Further, in at least one example embodiment, the processor 202 is configured to compute a response time of the VA in relation to processing of the subsequent input by the human agent. The response time of the VA may be computed if the respective confidence score of the at least one intent predicted for the subsequent input is greater than or equal to the predefined threshold score. The processor 202 is configured to deflect the conversation from the human agent to the VA for the subsequent input if the respective confidence score of the at least one intent for the subsequent input is greater than or equal to the predefined threshold score and if it is determined that the response time of the VA is less than the response time of the human agent in relation to the processing of the subsequent input. More specifically, the processor 202 deflects the conversation from the human agent to the VA if it determines that the VA is capable of handling the customer's subsequent input and moreover, the response time of the VA is faster than the response time of the human agent. That is, in addition to ensuring that the VA can respond to the customer's input with high confidence, the processor also ensures that the response is provided in a timely manner to the customer by comparing the response time of the VA with the response time of the human agent.

In at least one example embodiment, the processor 202 is configured to maintain a log of deflections between the VA and one or more human agents for each customer conversation handled by the VA. The processor 202 may further be configured to train the VA in customer conversation handling at periodic intervals based on the log of deflections. For example, if a particular form or type of query is causing deflections from the VA to the human agents, as learnt from the log of deflections, then the VA may be trained to handle the particular form or type of query to preclude the deflections from the VA to the human agents in subsequent VA conversations with customers.

The provisioning of response to the customer input based on the confidence score is further explained with reference to FIGS. 3A and 3B.

Figure 3A:
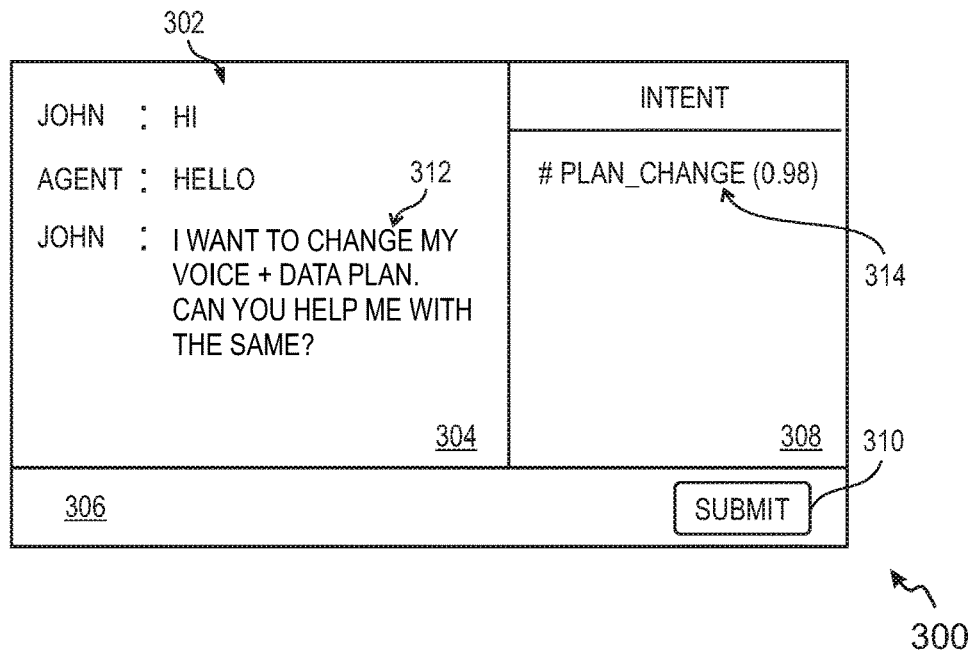
FIG. 3A shows a simplified representation of an agent console displaying an ongoing chat interaction between a VA and a customer of an enterprise, in accordance with an embodiment of the invention.

FIG. 3A shows a simplified representation of an agent console 300 displaying an ongoing chat interaction 302 between a VA and a customer of an enterprise, in accordance with an embodiment of the invention. It is noted that the agent console 300 is depicted herein for visualization purposes and that the VAs may not be typically associated with dedicated display screens or electronic devices for displaying the agent consoles, such as the agent console 300. In such scenarios, the VAs may be configured to: receive inputs from the customers, perform necessary NLP and interpretation of the customer inputs, fetch answers from the database (such as the database 250) and provision the answers to the customers. More specifically, the VAs may be configured to conduct the interactions with the customers as a series of instruction driven operations and thereby preclude the need of a dedicated console.

The agent console 300 is depicted to include a conversation display section 304, an input entry section 306 and an intent display section 308. The conversation display section 304 is configured to display chat inputs from the customer and the agent in an ongoing manner. The input entry section 306 is configured to receive agent input, which may subsequently be displayed in the conversation display section 304 upon selection of a submit button 310. The intent display section 308 may be configured to display predicted intents for the most recent customer input along with corresponding confidence scores.

The inputs provided by the customer during the ongoing chat interaction 302 are depicted to be associated with label 'JOHN', and the inputs provided by the agent are depicted to be associated with label 'AGENT', for illustration purposes. As can be seen, the customer input 312 is depicted to be associated with text 'I WANT TO CHANGE MY VOICE+DATA PLAN. CAN YOU HELP ME WITH THE SAME?'. As explained above, the processor 202 may be configured to receive each customer input in an ongoing manner and predict one or more intents corresponding to the customer input. The processor 202 may also be configured to compute a confidence score for each predicted intent. Accordingly, an intent 314 displaying text '# PLAN_CHANGE' may be predicted for the customer input 312 and the intent 314 is depicted to be associated with a confidence score of 0.98 implying that the VA is capable of appropriately responding to the customer input 312 with 98% confidence level.

The VA may be configured to compare the confidence score of the intent 314 with a predefined threshold score of '0.8'. As the intent 314 is associated with a confidence score that is greater than the predefined threshold score of '0.8', the VA may be configured to determine that there is no intent disambiguation needed or there is no need of a human intervention to answer the query and accordingly, the VA may respond to the customer as depicted in FIG. 3B.

Figure 3B:
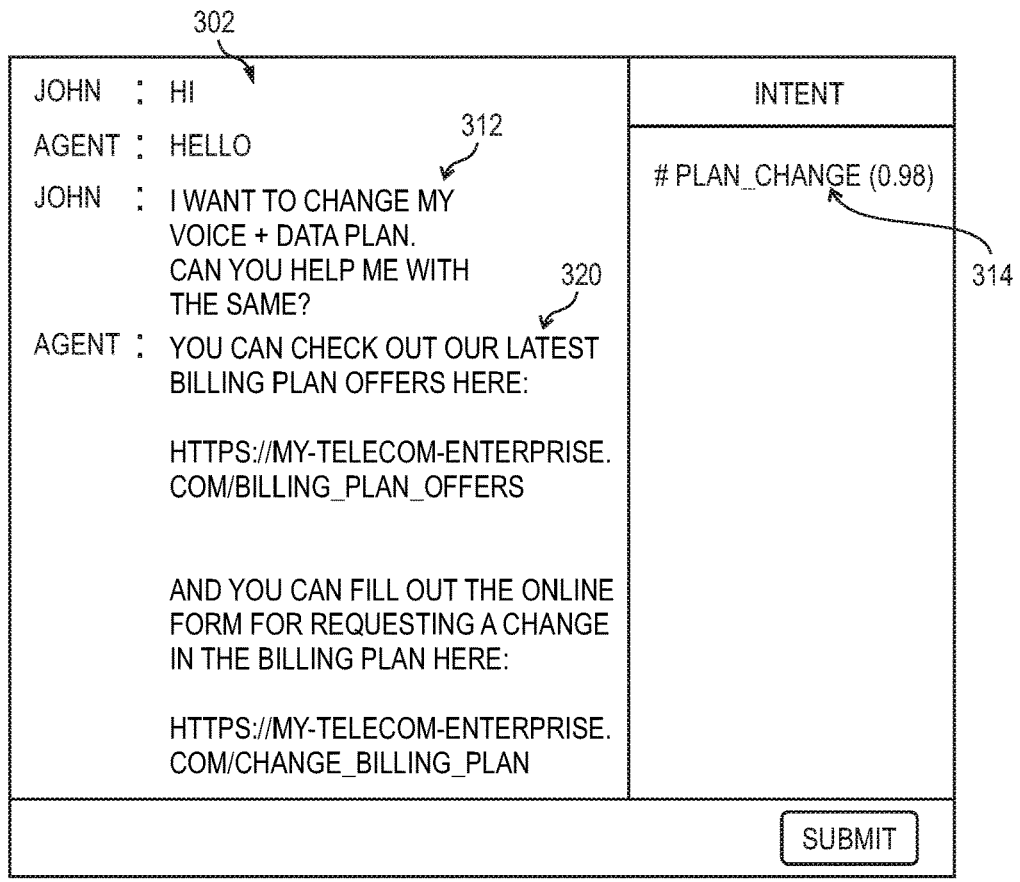
FIG. 3B shows a reply provided by the VA in response to a customer input based on the confidence score of the predicted intent, in accordance with an embodiment of the invention.

More specifically, FIG. 3B depicts a reply 320 provided by the VA in response to the customer input 312 based on the confidence score of the predicted intent 314, in accordance with an embodiment of the invention. The reply 320 by the VA is depicted to include text: 'YOU CAN CHECK OUT OUR LATEST BILLING PLAN OFFERS HERE: 'HTTPS://MY-TELECOM-ENTERPRISE.COM/BILLING_PLAN_OFFERS' AND YOU CAN FILL OUT THE ONLINE FORM FOR REQUESTING A CHANGE IN THE BILLING PLAN HERE: 'HTTPS://MY-TELECOM-ENTERPRISE.COM/CHANGE_BILLING_PLAN'.

The two self-help URLs provided by the VA in the reply 320 include all the information needed for changing the billing plan and as such serves as the 'effective response' to the customer input 312. The customer may access the Web pages associated with the URLs to change the billing plan.

It is noted that in some scenarios, the confidence score of the predicted intent may be less than the predefined threshold score. In such a case, the VA may be configured to determine that human intervention may be needed to respond to the customer input with high amount of confidence. Such a scenario is explained later with reference to FIG. 5.

In some scenarios, the processor 202 may predict one or more intents for a customer input and each predicted intent may be associated with a corresponding confidence score. The VA may be configured to compare the confidence scores of the predicted intents with the predefined threshold score and determine if one or more confidence scores are greater than or equal to the predefined threshold score. If it is determined that only one intent is associated with a confidence score greater than the predefined threshold score, then the VA may proceed to respond to the customer input. However, if it is determined that two or more intents are associated with confidence scores greater than or equal to the predefined threshold score, then the VA may be configured to request a disambiguation phrase from the apparatus 200. Such a scenario is explained with reference to FIGS. 4A and 4B.

Figure 4A:
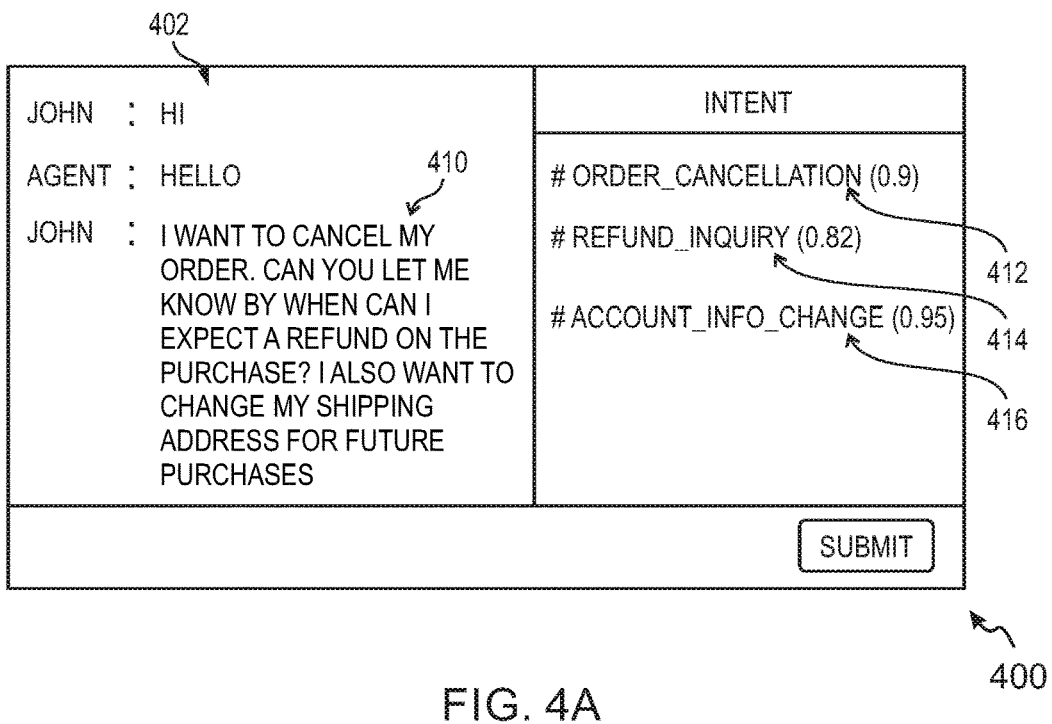
FIG. 4A shows a simplified representation of an agent console displaying an ongoing chat interaction between a VA and a customer of an enterprise for illustrating an example ambiguous customer input, in accordance with an embodiment of the invention.

FIG. 4A shows a simplified representation of an agent console 400 displaying an ongoing chat interaction 402 between a VA and a customer of an enterprise for illustrating an example ambiguous customer input, in accordance with an embodiment of the invention. The agent console 400 and its various components are similar to the agent console 300 and are not explained again herein. Further, the inputs provided by the customer during the ongoing chat interaction 402 are depicted to be associated with label 'JOHN', and the inputs provided by the agent are depicted to be associated with label 'AGENT', for illustration purposes.

Figure 4B:
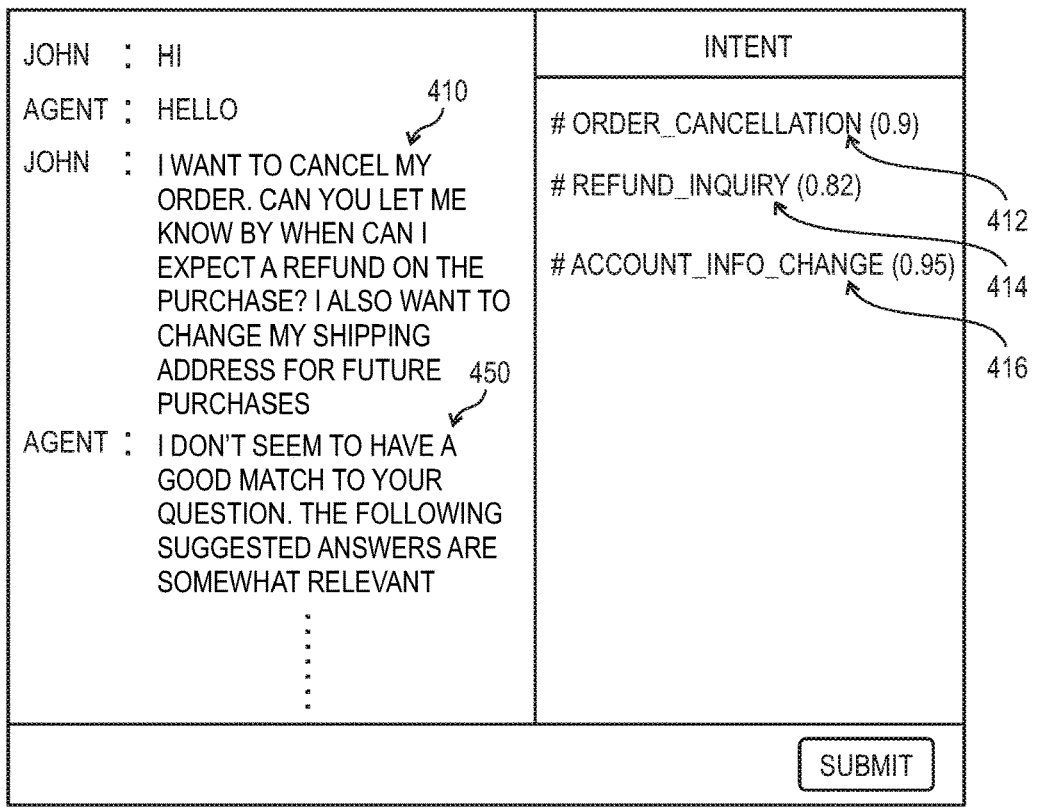
FIG. 4B shows a disambiguation phrase provided by the VA in response to the customer input based on the confidence scores of the predicted intents, in accordance with an embodiment of the invention.

As can be seen, customer input 410 is depicted to be associated with text 'I WANT TO CANCEL MY ORDER. CAN YOU LET ME KNOW BY WHEN CAN I EXPECT A REFUND ON THE PURCHASE? I ALSO WANT TO CHANGE MY SHIPPING ADDRESS FOR FUTURE PURCHASES'. As explained above, the processor 202 may be configured to receive each customer input in an ongoing manner and predict one or more intents corresponding to the customer input. The processor 202 may also be configured to compute a confidence score for each predicted intent. Accordingly, three intents 412, 414 and 416 are depicted to be predicted for the customer input 410 as follows: '# ORDER_CANCELLATION', '# REFUND_INQUIRY' and '# ACCOUNT_INFO_CHANGE'. The three intents 412, 414 and 416 are depicted to be associated with confidence scores of '0.9', '0.82' and '0.95', respectively. The VA may be configured to compare the confidence scores of the intents 412-416 with a predefined threshold score of '0.8'. As more than one intent from among the predicted intents 412-416 is associated with a confidence score that is greater than the predefined threshold score of '0.8', the VA may be configured to determine that the customer input 410 needs to be disambiguated and accordingly, the VA may request the apparatus 200 for a disambiguation phrase. The processor 202 may be configured to receive the request and provide a disambiguation phrase, such as for example 'I BELIEVE THAT YOU HAVE ASKED ABOUT MULTIPLE THINGS. PLEASE REWORD YOUR QUERY', or 'I DO NOT COMPLETELY UNDERSTAND YOUR QUESTION. CAN YOU ELABORATE YOUR QUESTION?'. The VA may be configured to receive such a disambiguation phrase and provision the phrase to the customer. In some cases, the disambiguation phrase may be 'I AM NOT 100% SURE OF THE ANSWER TO YOUR QUESTION, BUT I THINK IT MIGHT BE AMONG THE FOLLOWING ANSWERS' or 'I DON'T SEEM TO HAVE A GOOD MATCH TO YOUR QUESTION. THE FOLLOWING SUGGESTED ANSWERS ARE SOMEWHAT RELEVANT'. The provisioning of such a response to the customer is depicted in FIG. 4B. More specifically, FIG. 4B shows a disambiguation phrase 450 provided by the VA in response to the customer input 410 based on the confidence scores of the predicted intents 412-416 associated with the customer input 410, in accordance with an embodiment of the invention. The customer may review the agent's response and if the answers are relevant, then choose to end the conversation or ask another query. If the answers are not relevant, then the customer may choose to reword the query and seek VA's assistance on the reworded query.

In some embodiments, the VA may be configured to send an informatory alert to the apparatus 200 to indicate the fact that there may be a need of an intervention of human agent in the current conversation. It is noted that there is no hand-off to a human agent at this time. The disambiguation phrase, such as the disambiguation phrase 450, may be posed as a question back to the customer. Once the customer answers the question, the VA may be configured to pass this information back to the processor 202 to get fresh set of intents and confidence scores. If the new result-set has a non-ambiguous intent for which the confidence score is greater than the predefined threshold score, the VA conversation continues normally, and another alert may be sent to the processor 202 to cancel the previous alert. If the highest confidence score is less than the predefined threshold score, then the VA may be configured to determine that there is a need of a human agent to intervene briefly. The VA may then be configured to send a high priority alert to the processor 202 to request human agent intervention. In at least one example embodiment, the intent-history of the current conversation and the newly determined intent-list may be sent along with the alert to enable the processor 202 to identify the human agent with the right skill-set. Once the human agent is connected, he/she can see the conversation history as well as the necessary summary to enable the human agent to quickly respond to the customer query.

It is noted that even during the conversation involving the human agent, the processor 202 is configured to determine confidence score for intents predicted corresponding to the customer inputs and further, the processor 202 is configured to indicate to the human agent to disconnect if a normal state, i.e. a state where an intent with a confidence score greater than or equal to the predefined threshold score is obtained. Once the human agent disconnects (either completely or by moving into a supervise-only mode), the VA resumes the conversation. This reduces the average handle time (AHT) of the human agents as they intervene only briefly when the VA is not able to respond to the customer query with high confidence.

In at least one example embodiment, the VA may continuously learn from the answer provided by the human agent—thus enhancing the confidence-level for a similar question in a future conversation.

The interweaving of VA and human agent conversations have been explained so far with the human agent intervening in VA conversations only when the VA is not capable of handling a customer query with desired amount of confidence. However, it is noted that in some example scenarios, the VAs may also intervene in ongoing human agent interactions with customers. For example, in scenarios where a human agent may take time to respond to a customer query as it involves fetching of an appropriate answer from a database and where an answer is readily available with the VA, the VA may intervene in the conversation, thereby enabling reduction in the AHT of the human agent. The human agent may then resume the conversation when it is more appropriate for the human agent to conduct the conversation. Such a scenario is explained with reference to FIG. 5.

Figure 5:
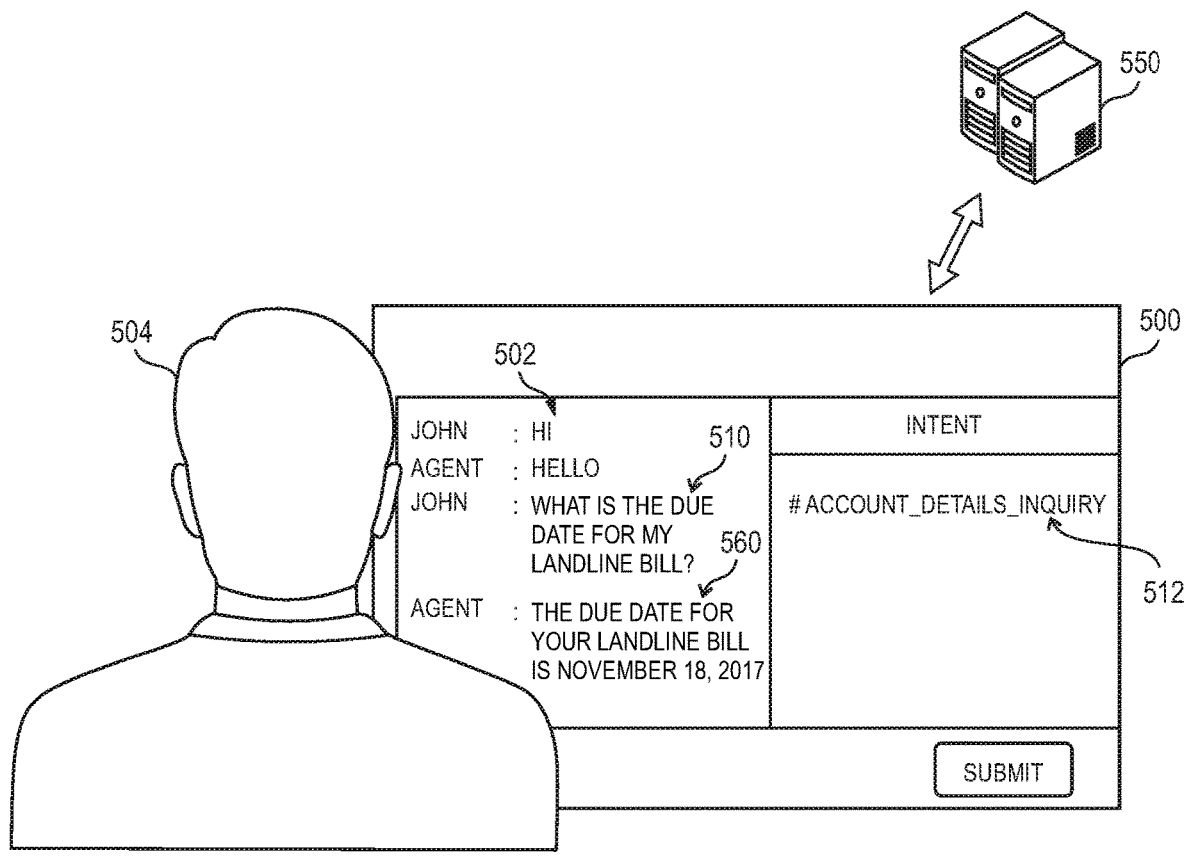
FIG. 5 shows a simplified representation of an agent console displaying an ongoing chat interaction between a human agent and a customer of an enterprise for illustrating VA intervention in the human agent chat interaction, in accordance with an embodiment of the invention.

FIG. 5 shows a simplified representation of an agent console 500 displaying an ongoing chat interaction 502 between a human agent 504 and a customer (not shown in FIG. 5) of an enterprise for illustrating VA intervention in the human agent chat interaction 502, in accordance with an embodiment of the invention. The agent console 500 and its various components are similar to the agent console 300 and are not explained again herein. Further, the inputs provided by the customer during the ongoing chat interaction 502 are depicted to be associated with label 'JOHN', and the inputs provided by the human agent 504 are depicted to be associated with label 'AGENT', for illustration purposes.

As can be seen, customer input 510 is depicted to be associated with text 'WHAT IS THE DUE DATE FOR MY LANDLINE BILL?'. As explained above, the processor 202 may be configured to receive each customer input in an ongoing manner and predict one or more intents corresponding to the customer input. The processor 202 may also be configured to compute a confidence score for each predicted intent. Accordingly, an intent 512 displaying text '# ACCOUNT_DETAILS_INQUIRY' is depicted to be predicted for the customer input 510. Further, the predicted intent 512 is depicted to be associated with a confidence score of '0.98'.

In at least one example embodiment, if the confidence score for a predicted intent is greater than another predefined threshold score (for example, '0.95'), then the VA may intervene in such conversations and the human agent 504 may resume the conversation only once the confidence score for the predicted intent falls below the predefined threshold score.

In case of the customer input 510, the human agent 504 may have to specifically look up a database, such as the database 250, to identify the appropriate response for the customer. If such a response is readily available with a VA on account of tracking customer information, and the confidence score associated with the predicted intent is greater than the predefined threshold score, then the VA such as the VA 550 may intervene in the conversation as depicted by input 560: 'THE DUE DATE FOR YOUR LANDLINE BILL IS NOV. 18, 2017'.

Such judicious interweaving of VA and human agent responses in an ongoing conversation with the customer provides a high-quality experience to the customer and, moreover, the assistance is provided to the customer in a timely manner.

A method for facilitating agent conversations with customers of an enterprise is explained next with reference to FIG. 6.

Figure 6:
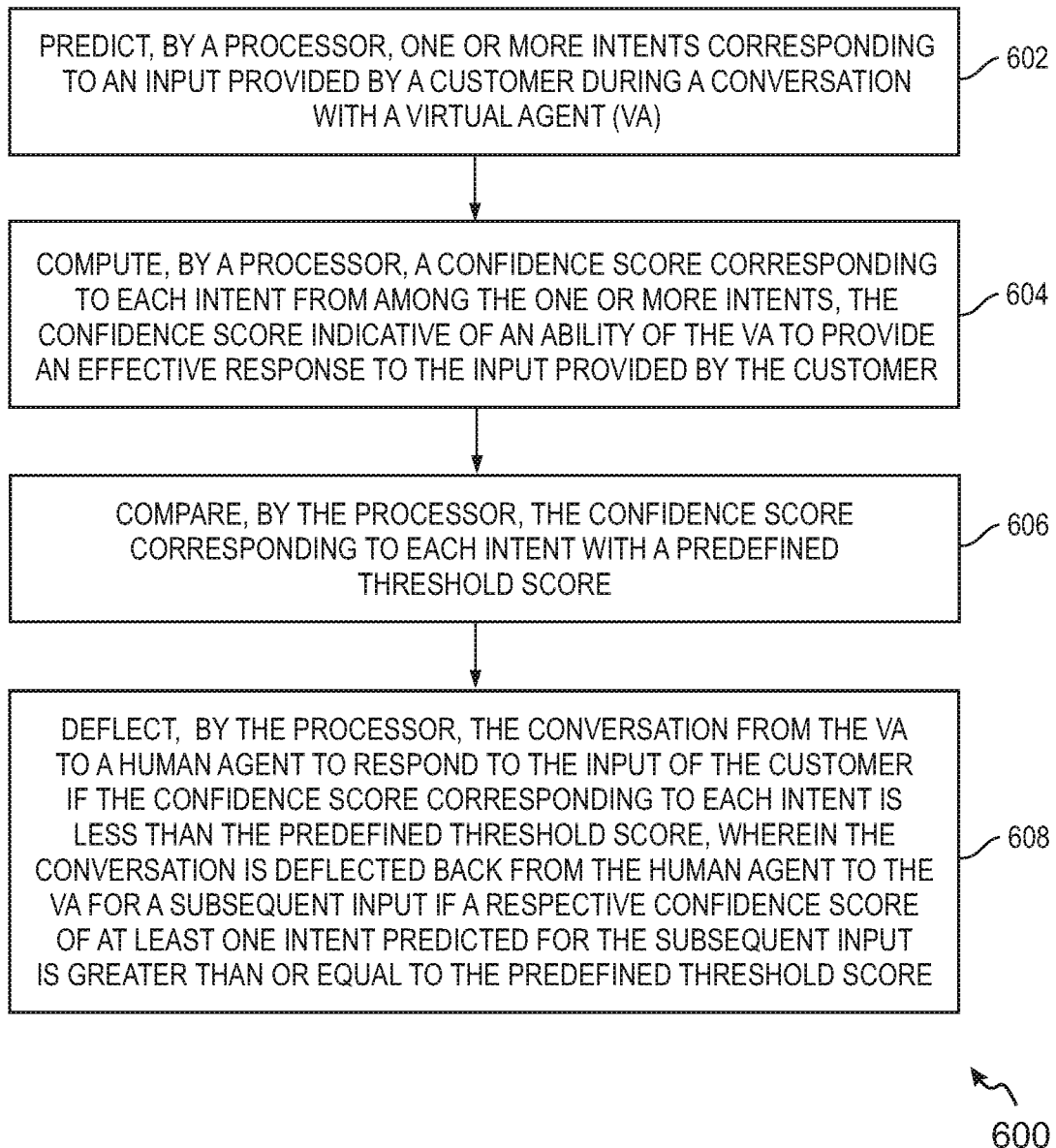
FIG. 6 is a flow diagram of an example method for facilitating agent conversations with customers of an enterprise, in accordance with an embodiment of the invention.

FIG. 6 is a flow diagram of an example method 600 for facilitating agent conversations with customers of an enterprise, in accordance with an embodiment of the invention. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. It is noted that, the operations of the method 600 can be described and/or practiced by using any system other than the apparatus 200. The method 600 starts at operation 602.

At operation 602 of the method 600, one or more intents corresponding to an input provided by a customer during a conversation with a Virtual Agent (VA) are predicted by a processor, such as the processor 202 of the apparatus 200. The one or more customer intents may be predicted based on current input, current journey and/or past journey on the enterprise interaction channels. For example, the customer may provide the following input 'THE VIEWFINDER OF MY DSLR CAMERA IS NOT WORKING' to an agent. Based on such an input, the processor 202 may be configured to predict the intent as 'PRODUCT TROUBLESHOOTING'. In some embodiments, the customer intent may be predicted based on past interactions of the customer on enterprise interaction channels. For example, if a customer has recently purchased a mobile phone, then the intent for requesting conversation may most likely be related to troubleshooting the purchased product or buying a new accessory related to the phone. In some embodiments, the customer intent may be predicted based on current interaction of the customer on an enterprise interaction channel. For example, a customer having visited the enterprise Website may browse through a number of Web pages and may have viewed a number of products on the Web site prior to requesting a conversation with an agent. All such activity of the customer during the current journey of the customer on the enterprise Website may be captured and used for intent prediction purposes as explained with reference to FIG. 2.

In an embodiment, the processor is configured to collate information related to the customer such as the device used for accessing the Web site, the browser and the operating system associated with the device, the type of Internet connection (whether cellular or Wi-Fi), the IP address, the location co-ordinates. This information is combined with information related to current and past customer activity on enterprise interaction channels, such as enterprise websites. The processor transforms or convert all collated information into a more meaningful or useful form. The processor 202 is further caused to extract features from the transformed data. For example, the type of device used by the customer for requesting conversation with the agent may be identified as one feature. Similarly, the type of Internet connection may be identified as another feature. The sequence of Web pages visited by the customer prior to requesting the conversation with the agent may be identified as one feature. The category of products viewed/selected on the Web pages may be identified as another feature. Furthermore, customer conversational inputs split into n-grams, unigrams, bigrams and trigrams and the word phrases in the conversational inputs may also be selected as features. The extracted features from the transformed customer data may then be provided to at least one classifier associated with intention prediction to facilitate prediction of the at least one intention of customer. In an embodiment, the classifiers may utilize any combination of the above-mentioned input features to predict the customer's likely intents.

At operation 604 of the method 600, a confidence score corresponding to each intent from among the one or more intents is computed. The confidence score is indicative of an ability of the VA to provide an effective response to the input provided by the customer. In one embodiment, an intent prediction classifier is trained to output a numerical value signifying a confidence score of the corresponding prediction. For example, in the simplest illustrative form, if 70% of customers who had a particular sequence of visiting Web pages on the enterprise Website, were of a particular gender and age group and used a particular device and browser, had contacted customer support for a particular intent, then the classifier may be trained to output a numerical value '0.70' for a predicted intent corresponding to customer input. This may signify that the 70% of the times the predicted intent matched the customer input based on the characteristic/features exhibited by the customer and/or customer activity on the enterprise interaction channels. The classifier may be provided with transcripts of a large number of previous conversations along with identified intents (i.e. intents tagged by human agents for instance) for the customer inputs in those conversations so as to train the classifier in computing the confidence score corresponding to each predicted intent.

In one embodiment, the confidence score is computed based on a degree of correlation between the customer input and a stored prediction from among a plurality of stored predictions. More specifically, a plurality of probable customer intents may be stored in a database, such as the database 250 shown in FIG. 2. Each stored intent may be tagged with several keywords related to the intent. The words in the customer input and the variations thereof may be correlated with tagged keywords to determine a degree of correlation therebetween. The degree of correlation may configure a degree of confidence in correct prediction of the intent, which in turn, signifies a degree of confidence in the VA's ability to provide an effective response to the input. In an illustrative example, if an intent 'Intent 1' is predicted for a customer input and it is associated with a confidence score of '0.7', then it is implied that there is 70% likelihood of the Intent 1 being the correct intent of the customer. Accordingly, for a response provided to the customer by the VA based on the predicted intent, there is a 70% likelihood of the answer being the appropriate answer to the query. To that effect, the confidence score of the predicted intent reflects a measure of how confident the VA is of providing an effective response (i.e. of responding appropriately) to the customer's input.

At operation 606 of the method 600, the confidence score corresponding to each intent is compared with a predefined threshold score. In an illustrative example, the predefined threshold score is '0.8' (i.e. 80%). It is noted that the predefined threshold score may be selected to be any value based on machine learning and/or empirical research.

At operation 608 of the method 600, the conversation is deflected by the processor, from the VA to a human agent to respond to the input of the customer if the confidence score corresponding to each intent is less than the predefined threshold score. If the confidence score of at least one intent from among the one or more intents corresponding to the input is greater than or equal to the predefined threshold score, the VA is configured to provide the response to the customer. In one embodiment, the response provided by the VA includes a request to the customer to provide clarification on the input if the confidence score corresponding to two or more intents is greater than the predefined threshold score.

In one embodiment, the processor receives a clarification input provided by the customer in response to the request and processes the clarification input. The processing of the clarification input includes performing the steps of predicting intents, computing confidence scores for predicted intents and comparing the confidence scores to the predefined threshold score to determine whether the VA is capable of responding to the clarification input or not. If the VA is determined to be capable of responding to the clarification input, then the VA may be configured to provide the response (i.e. the effective response) to the customer. If not, the conversation is deflected from the VA to the human agent by the processor.

In at least one example embodiment, contextual information related to the conversation between the customer and the VA is passed to the human agent subsequent to deflection of the conversation from the VA to the human agent. The contextual information may include a summary of the conversation so far, predicted intents for previous customer inputs, etc. The contextual information enables the human agent to respond appropriately to the customer's input.

In some cases, the conversation may be deflected back from the human agent to the VA for a subsequent input if a respective confidence score of at least one intent predicted for the subsequent input is greater than or equal to the predefined threshold score. Further, in at least one example embodiment, the processor is configured to compute a response time of the VA in relation to processing of the subsequent input by the human agent. The response time of the VA may be computed if the respective confidence score of the at least one intent predicted for the subsequent input is greater than or equal to the predefined threshold score. The processor is configured to deflect the conversation from the human agent to the VA for the subsequent input if the respective confidence score of the at least one intent for the subsequent input is greater than or equal to the predefined threshold score and if it is determined that the response time of the VA is less than the response time of the human agent in relation to the processing of the subsequent input. More specifically, the processor deflects the conversation from the human agent to the VA if it determines that the VA is capable of handling the customer's subsequent input and moreover, the response time of the VA is faster than the response time of the human agent. Such judicious interweaving of VA and human agent responses in an ongoing conversation with the customer provides a high-quality experience to the customer and, moreover, the assistance is provided to the customer in a timely manner.

Figure 7:
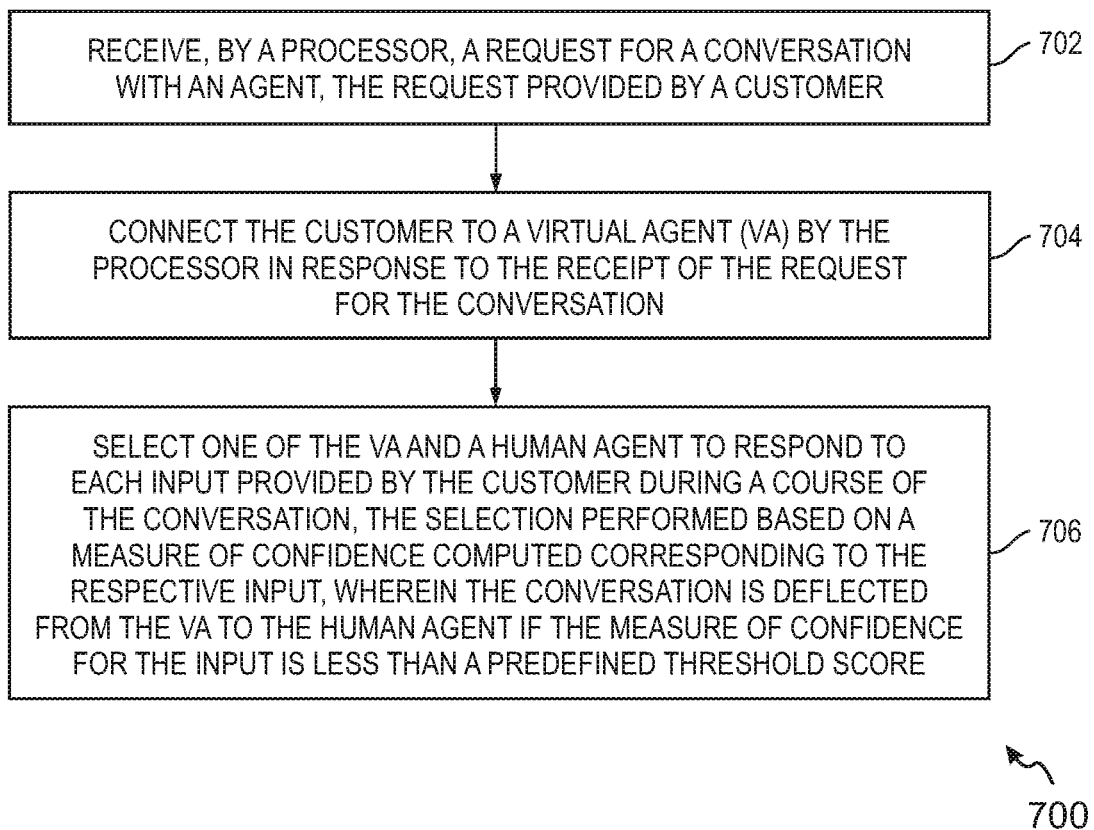
FIG. 7 is a flow diagram of an example method for facilitating agent conversations with customers of an enterprise, in accordance with another embodiment of the invention.

FIG. 7 is a flow diagram of an example method 700 for facilitating agent conversations with customers of an enterprise, in accordance with another embodiment of the invention. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the apparatus 200. It is noted that, the operations of the method 700 can be described and/or practiced by using any system other than the apparatus 200. The method 700 starts at operation 702.

At operation 702 of the method 700, a request for a conversation with an agent is received by the processor. The request is provided by a customer. As explained with reference to FIG. 1, a customer may request a conversation with an agent by clicking on a widget or a hyperlink on the Website displayed on the enterprise Website. The widget or the hyperlink may be configured to display text such as 'Let's Chat' or 'Need Assistance, Click Here!'. The customer may click on the widget or the hyperlink to seek assistance. In some example scenarios, the customer may also call a customer care number displayed on the enterprise Website to request a conversation with the agent.

At operation 704 of the method 700, the customer is connected to a Virtual Agent (VA) by the processor in response to the receipt of the request for the conversation. The processor may be configured to use initial interaction handling logic and, in conjunction with the registry of VAs stored in a database such as the database 250 shown in FIG. 2, determine a VA appropriate for interacting with the customer. In one embodiment, the next available VA from among a pool of VAs may be selected as the appropriate VA for conducting the conversation with the customer. In another embodiment, a high-level intent may be predicted based on the customer's current and/or past interaction history and the VA capable of handling customers for the predicted intent may be selected as the appropriate VA for conducing the conversation with the customer. In yet another embodiment, a customer's persona may be predicted based on current and past journeys of the customer on the enterprise interaction channels, and a VA more suited to a customer's persona type may be selected as the appropriate VA for conducting the conversation with the customer. The selected VA may thereafter initiate the conversation with the customer.

At operation 706 of the method 700, one of the VA and a human agent is selected to respond to each input provided by the customer during a course of the conversation. The selection is performed based on a measure of confidence computed corresponding to the respective input. The measure of confidence is indicative of an ability of the VA to provide an effective response to the respective input provided by the customer. The term 'effective response' as used throughout the description refers to a reply appropriate to the input provided by the customer and which carries the conversation forward towards the resolution of the customer's query input. In most cases, the term 'effective response' may refer to a single VA input, which either partially or completely answers the customer's query input. However, in some cases, the term 'effective response' may involve an interim stage of disambiguation of the customer's query followed by the eventual resolution of the customer's query input.

For example, if the measure of confidence computed for an input is high, i.e. greater than predefined threshold score, then the VA may be selected to respond to the corresponding input. However, if the measure of confidence computed for an input is low, i.e. less than or equal to the predefined threshold score, then the conversation may be deflected from the VA to an appropriate human agent by the processor. The measure of confidence may be computed in terms of confidence scores for each predicted intent, which in turn, may be indicative of the VA's ability to respond to the customer's input. The computation of confidence scores, comparison of the confidence scores with the predefined threshold score and subsequent decision-making in relation to conversation deflection may be performed as explained with reference to operation 608 in FIG. 6 and is not explained again herein.

In one embodiment, the conversation is deflected back from the human agent to the VA for a subsequent input if a respective measure of confidence for the subsequent input is greater than or equal to the predefined threshold score. Thus, the human agent intervenes only briefly, every time when the VA is not able to respond to the customer query with high confidence, thereby reducing the AHT of the human agent.

Figure 8A:
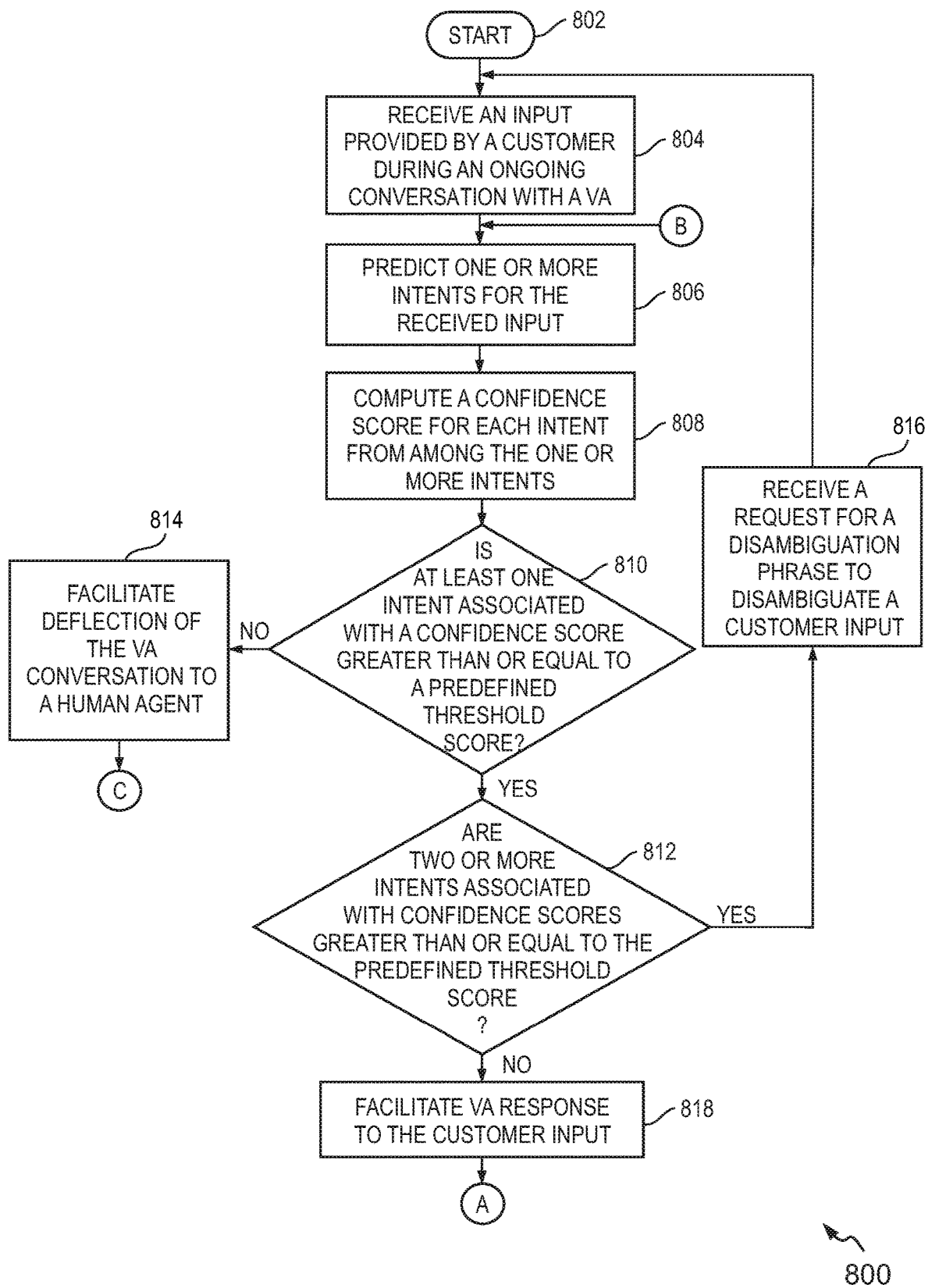
FIGS. 8A and 8B show a flow diagram of a method for facilitating an agent conversation with a customer of an enterprise, in accordance with an embodiment of the invention.
Figure 8B:
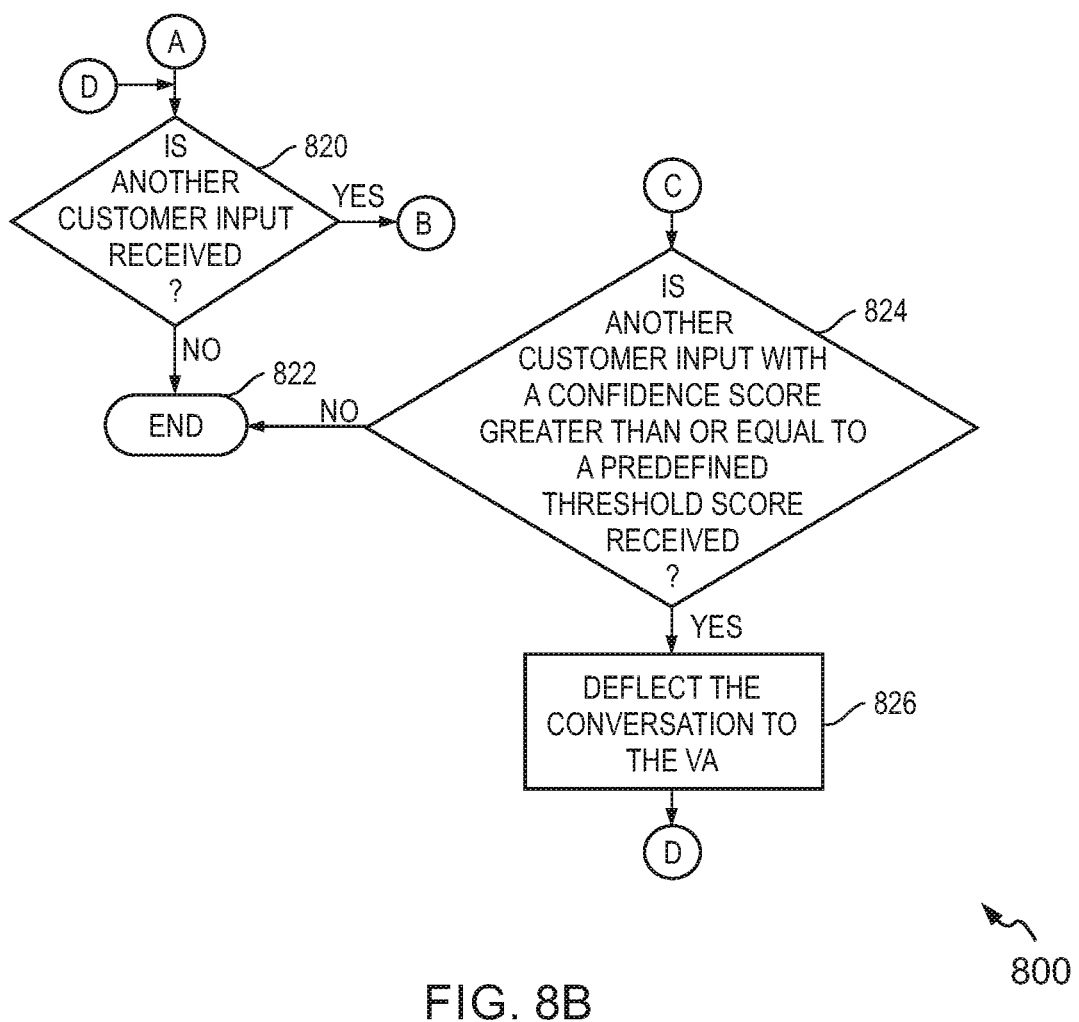

FIGS. 8A and 8B show a flow diagram of a method 800 for facilitating an agent conversation with a customer of an enterprise, in accordance with another embodiment of the invention. The various steps and/or operations of the flow diagram, and combinations of steps/operations in the flow diagram, may be implemented by, for example, hardware, firmware, a processor, circuitry and/or by an apparatus such as the apparatus 200 of FIG. 2 and/or by a different device associated with the execution of software that includes one or more computer program instructions. The method 800 starts at operation 802. At operation 802 of the method 800, a conversation between a VA and a customer of an enterprise is initiated.

At operation 804 of the method 800, an input provided by a customer during an ongoing conversation with a VA is received.

At operation 806 of the method 800, one or more intents are predicted for the received input.

At operation 808 of the method 800, a confidence score is computed for each intent from among the one or more intents.

At operation 810 of the method 800, it is determined if at least one intent from among the one or more intents is associated with a confidence score greater than or equal to a predefined threshold score.

If it is determined that at least one intent is associated with a confidence score greater than the predefined threshold score, then operation 812 is performed. Else, operation 814 is performed.

At operation 812 of the method 800, it is determined if two or more intents are associated with a confidence score greater than or equal to a predefined threshold score. If two or more intents are associated with confidence scores greater than or equal to the predefined threshold score, then operation 816 is performed. Else operation 818 is performed.

At operation 816 of the method 800, a disambiguation phrase is requested to disambiguate the customer input. The disambiguation phrase is thereafter provided by the VA to the customer to receive a reworded customer input. Operation 804 is thereafter repeated.

At operation 818 of the method 800, it is determined that there is only intent with a confidence score of greater than or equal to the predefined threshold score. The VA may then be configured to respond to the customer input without the need to disambiguate the customer input or the need to involve a human agent.

At operation 820, it is determined if another customer input is received. If yes, operation 806 onwards is repeated for the new customer input. If another customer input is not received then the method 800 ends at operation 822.

At operation 814, the conversation is deflected to an appropriate human agent along with conversational context. The human agent may be configured to respond to the customer input based on the context. Thereafter operation 824 is performed. At operation 824 of the method 800, it is determined if a customer input with intent associated with confidence score of greater than a predefined threshold score is received. If such a customer input is received, then at operation 826 of the method 800, the conversation is deflected to the VA and operations 820 onwards are repeated. If no such customer input is received, then the human agent continues the conversation till graceful closure and the method 800 ends at operation 822.

Without in any way limiting the scope, interpretation, or application of the claims appearing below, advantages of one or more of the exemplary embodiments disclosed herein provide numerous advantages. The techniques disclosed herein provide techniques for facilitating agent conversations with customers of the enterprise. The techniques suggested herein ensures that the human agents are alerted only in cases where the VA is "stuck", thereby achieving following objectives: (1) the customers continue getting high-quality answers to their queries; (2) the human agents are used only in exceptional cases; and (3) the virtual agent continues to learn even during an ongoing conversation—thereby, reducing the dependency on human agents for the same set of questions.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an apparatus, as described and depicted in FIG. 2. A computer-readable medium may include a computer-readable storage medium that may be any media or means that can contain or store the instructions for use by or in connection with an instruction execution system, system, or device, such as a computer.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200 and its various components such as the processor 202, the memory 204, the I/O module 206, the communication module 208, the database 250 and the centralized circuit system 212 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 6, 7, 8A and 8B). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for facilitating agent conversations with customers of an enterprise, the method comprising:
   receiving, by a processor, a request for a conversation with an agent, the request provided by a customer;
   connecting the customer to a human agent by the processor in response to the receipt of the request for the conversation;
   for an input provided by the customer during the conversation with the human agent, determining by the processor, whether a Virtual Agent (VA) is capable of providing a faster response to the input of the customer than the human agent; and
   deflecting the conversation, by the processor, from the human agent to the VA to respond to the input of the customer based at least in part on the determination that the VA is capable of providing the faster response to the input of the customer than the human agent,
   wherein the conversation is deflected back from the VA to the human agent for a subsequent input if it is determined that the VA is not capable of providing the faster response to the subsequent input of the customer than the human agent.

2. The method as claimed in claim 1, wherein providing the faster response to the input comprises fetching information from one of a database and a customer relationship management (CRM) system.

3. The method as claimed in claim 1, wherein the conversation is deflected from the human agent to the VA if the response is readily available with the VA on account of tracking of the conversation by the VA.

4. The method as claimed in claim 1, further comprising:
   predicting, by the processor, one or more intents corresponding to the input provided by the customer;
   computing, by the processor, a confidence score corresponding to each intent from among the one or more intents, the confidence score indicative of an ability of the VA to provide an effective response to the input provided by the customer; and comparing, by the processor, the confidence score corresponding to each intent with a predefined threshold score,
wherein the conversation is deflected from the human agent to the VA if the confidence score of at least one intent from among the one or more intents is greater than or equal to the predefined threshold score and the VA is capable of providing the faster response to the input of the customer than the human agent.

5. The method as claimed in claim 4, wherein the one or more intents corresponding to the input are predicted based on at least one of the input, current conversation history and a past conversation history of the customer.

6. The method as claimed in claim 1, further comprising:
passing, by the processor, a contextual information related to the conversation between the customer and the human agent to the VA subsequent to the deflection of the conversation from the human agent to the VA.

7. The method as claimed in claim 1, wherein the conversation is deflected to one or more VAs during a course of the conversation based at least in part on a capability of respective VA from among the two or more VAs to provide faster effective response to a corresponding customer input.

8. The method as claimed in claim 1, further comprising:
maintaining, by the processor, a log of deflections between the human agent and one or more VAs for each customer conversation handled by the human agent; and
training the human agent in customer conversation handling at periodic intervals by the processor based on the log of deflections.

9. An apparatus for facilitating agent conversations with customers of an enterprise, the apparatus comprising:
a memory for storing instructions; and
a processor configured to execute the instructions and thereby cause the apparatus to at least:
receive a request for a conversation with an agent, the request provided by a customer;
connect the customer to a human agent in response to the receipt of the request for the conversation;
for an input provided by the customer during the conversation with the human agent, determine whether a Virtual Agent (VA) is capable of providing a faster response to the input of the customer than the human agent; and
deflect the conversation from the human agent to the VA to respond to the input of the customer based at least in part on the determination that the VA is capable of providing the faster response to the input of the customer than the human agent,
wherein the conversation is deflected back from the VA to the human agent for a subsequent input if it is determined that the VA is not capable of providing the faster response to the subsequent input of the customer than the human agent.

10. The apparatus as claimed in claim 9, wherein providing the faster response to the input comprises fetching information from one of a database and a customer relationship management (CRM) system.

11. The apparatus as claimed in claim 9, wherein the conversation is deflected from the human agent to the VA if the response is readily available with the VA on account of tracking of the conversation by the VA.

12. The apparatus as claimed in claim 11, wherein the apparatus is further caused to:
predict one or more intents corresponding to the input provided by the customer;
compute a confidence score corresponding to each intent from among the one or more intents, the confidence score indicative of an ability of the VA to provide an effective response to the input provided by the customer; and
compare the confidence score corresponding to each intent with a predefined threshold score,
wherein the conversation is deflected from the human agent to the VA if the confidence score of at least one intent from among the one or more intents is greater than or equal to the predefined threshold score and the VA is capable of providing the faster response to the input of the customer than the human agent.

13. The apparatus as claimed in claim 12, wherein the one or more intents corresponding to the input are predicted based on at least one of the input, current conversation history and a past conversation history of the customer.

14. The apparatus as claimed in claim 9, wherein the apparatus is further caused to:
pass a contextual information related to the conversation between the customer and the human agent to the VA subsequent to the deflection of the conversation from the human agent to the VA.

15. The apparatus as claimed in claim 9, wherein the conversation is deflected to one or more VAs during a course of the conversation based at least in part on a capability of respective VA from among the two or more VAs to provide faster effective response to a corresponding customer input.

16. The apparatus as claimed in claim 9, wherein the apparatus is further caused to:
maintain a log of deflections between the human agent and one or more VAs for each customer conversation handled by the human agent; and
train the human agent in customer conversation handling at periodic intervals by the processor based on the log of deflections.

17. A computer-implemented method for facilitating agent conversations with customers of an enterprise, the method comprising:
receiving, by a processor, a request for a conversation with an agent, the request provided by a customer;
connecting the customer to a human agent by the processor in response to the receipt of the request for the conversation;
for an input provided by the customer during the conversation with the human agent, predicting, by the processor, one or more intents corresponding to the input provided by the customer;
computing, by the processor, a confidence score corresponding to each intent from among the one or more intents, the confidence score indicative of an ability of a Virtual Agent (VA) to provide an effective response to the input provided by the customer;
comparing, by the processor, the confidence score corresponding to each intent with a predefined threshold score;
determining by the processor, whether the VA is capable of providing a faster response to the input of the customer than the human agent; and
deflecting the conversation, by the processor, from the human agent to the VA to respond to the input of the customer based at least in part on the determination that the confidence score of at least one intent from among the one or more intents is greater than or equal to the predefined threshold score and the VA is capable of providing the faster response to the input of the customer than the human agent, wherein the conversation is deflected back from the VA to the human agent for a subsequent input if it is determined that the VA is not capable of providing the faster response to the subsequent input of the customer than the human agent.

18. The method as claimed in claim 17, wherein providing the faster response to the input comprises fetching information from one of a database and a customer relationship management (CRM) system.

19. The method as claimed in claim 17, wherein the conversation is deflected to one or more VAs during a course of the conversation based at least in part on a capability of respective VA from among the two or more VAs to provide faster effective response to a corresponding customer input.

20. The method as claimed in claim 17, further comprising:
- maintaining, by the processor, a log of deflections between the human agent and one or more VAs for each customer conversation handled by the human agent; and
- training the human agent in customer conversation handling at periodic intervals by the processor based on the log of deflections.

* * * * *